Nov. 18, 1952 　　J. K. SHANNON ET AL　　2,618,673
COVER FOR BATTERIES
Filed July 17, 1950　　　　　　　　　　2 SHEETS—SHEET 1
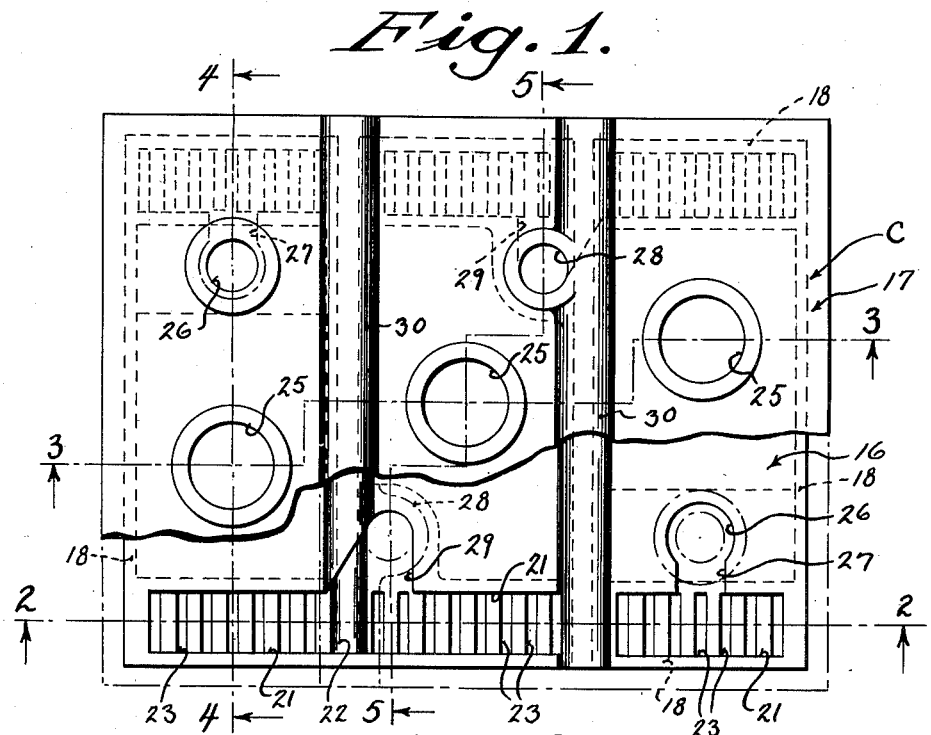
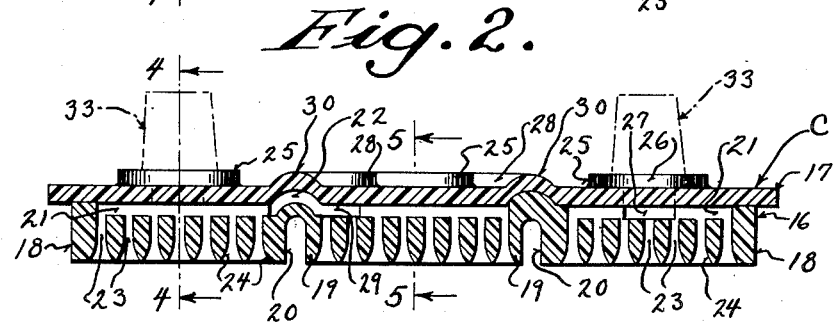
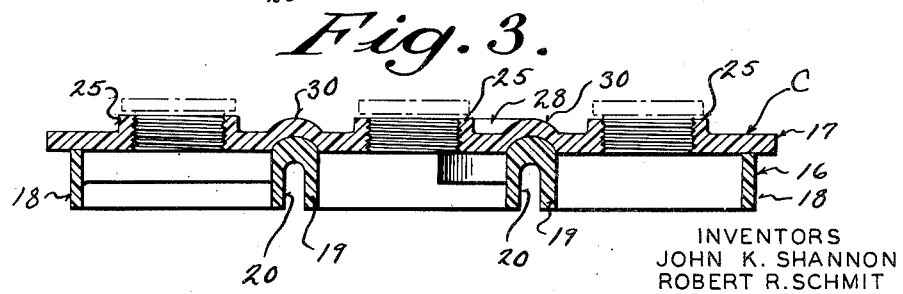
INVENTORS
JOHN K. SHANNON
ROBERT R. SCHMIT
BY
*Monry Wright*
ATTORNEYS

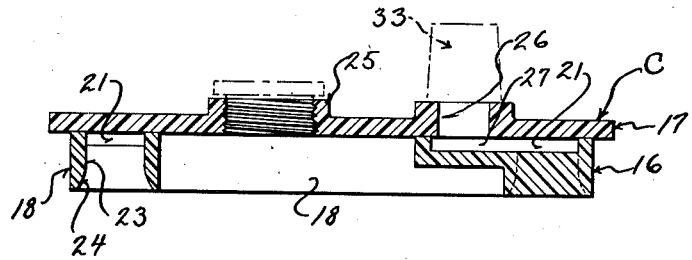
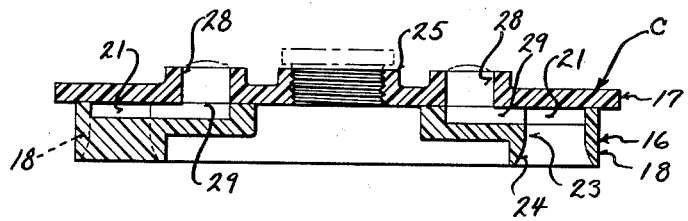
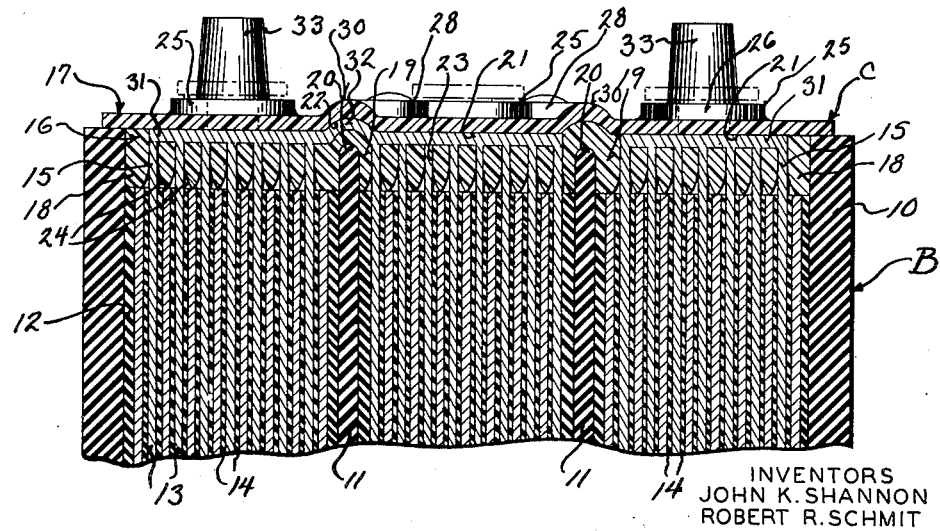

Patented Nov. 18, 1952

2,618,673

UNITED STATES PATENT OFFICE 2,618,673

COVER FOR BATTERIES

John K. Shannon and Robert R. Schmit, Kenosha, Wis.

Application July 17, 1950, Serial No. 174,314

2 Claims. (Cl. 136—134)

This invention appertains broadly to electric storage batteries having plates and separators, and more particularly to a novel cover for a storage battery case.

One of the primary objects of the invention is to provide a novel cover so constructed and designed as to eliminate many individual parts and construction operations now necessary in case covers commonly employed and which will prevent acid spillage and effectively act as a support for the battery posts and intercell connector straps.

Another salient object of the invention is to provide a novel storage battery cover, which will function as a closed mold for the intercell connector straps and the shoulders for the plate lugs, which support the plates and electrically connect the plates.

A further important object of the invention is to provide a cover formed from dielectric material, such as polystyrene, or the like, which will effectively lessen the possibility of shorts between cells, in view of the embedding of the shoulders and connector straps directly in the dielectric material.

A still further object of the invention is to provide novel means for forming the cover, whereby the mold cavities can be readily cast therein at the time of the making of the cover.

With these and other objects in view, the invention consists in the novel construction, arrangement and formation of parts, as will be hereinafter more specifically described and claimed, and illustrated in the accompanying drawings, in which drawings, Figure 1 is a plan view of the battery cover prior to the placing thereof on a battery case, parts of the cover being partially broken away to illustrate mold cavities.

Figure 2 is a longitudinal sectional view through the cover taken on the line 2—2 of Figure 1, looking in the direction of the arrows and illustrating mold cavities.

Figure 3 is a similar section, but taken on the line 3—3 of Figure 1, looking in the direction of the arrows.

Figure 4 is a transverse sectional view through the cover taken on the line 4—4 of Figure 1, and illustrating the construction of the cover for an end cell.

Figure 5 is a transverse sectional view similar to Figure 4, but taken on the line 5—5 of Figure 1, looking in the direction of the arrows and illustrating the construction of the cover for an intermediate cell.

Figure 6 is a fragmentary longitudinal sectional view, through a storage battery with the cover applied thereto and the connector straps and shoulders molded in the cover.

Referring to the drawings in detail, wherein similar reference characters designate corresponding parts throughout the several views, the letter C generally indicates our improved cover for the case of a storage battery B.

The storage battery B per se, forms no part of the present invention, and will not be described in detail, but it is to be noted that the same includes a molded battery case 10 having integral transverse partitions 11, defining individual cells 12. In the present instance, three cells have been illustrated but, obviously, more or less can be provided. The cells 12 receive the battery plates 13 and the separators 14. As is common, the battery plates are provided with upstanding lugs 15 and the lugs for one set of plates are disposed on one side of a cell and the lugs for the other set of plates are arranged on the other side of the cell.

Now, referring to our novel cover C, the same is formed from dielectric material, preferably, but not necessarily, of the polystyrene type, and in fact the cover can be made from a transparent thermoplastic if such should be desirable or preferred. The cover in its formed ready for use state, is of an integral construction, but for ease in manufacturing, as will later appear, the same initially includes a bottom section 16 and a top section 17. In the finished cover the sections 16 and 17 are joined and integrally fused by the use of an acetate or similar chemical for causing the adherence of the polystyrene sections 16 and 17.

The lower section 16 includes a depending marginal skirt 18 for snugly fitting within the battery case 10, and this skirt is offset from the marginal edge of the top section 17, so that said section can intimately engage the upper face of the case 10. As is best shown in Figures 1, 2, 3 and 6, like depending transverse skirts 19 are provided for extending into the individual cells of the battery at the partitions 11 thereof, and essentially the section 16 can be provided with a way or groove 20 for receiving the partitions 11, and the way or groove defines the skirts 19 for engaging the partitions. The section 16, at the necessary points is thickened and reinforced and the upper faces of these thickened and reinforced portions are provided with shoulder cavities 21 and communicating connector strap cavities 22. These cavities are molded directly in the section 16 at the time of the formation thereof and when the section 17 is united with the section 16, the cavities are completed. Also molded in the section 16 and communicating with the cavities 21 are equidistantly spaced vertical ways 23, which receive the lugs 15 of the cell plates and, as is clearly shown in Figures 1 and 2, these ways communicate at their upper ends with the cavities 21. The lower ends of the ways are preferably flared, as at 24, to facilitate the insertion of the battery plate lugs 15 into said ways.

The section 17 has molded therein at the appropriate points, the filling necks or bosses 25, for the individual cells and also molded in the section 17 are the openings and the surrounding collars or bosses 26 for the battery terminal posts, and obviously, the openings 26 are formed in the cover at the diagonal corners thereof for the end cells only. The openings 26 communicate with the lateral cavities 27, which communicate with the shoulder cavities 21 for the end cells. Openings 28 are also molded in the section 17, adjacent to the points of contact of the cover with the cell partitions 11, and these openings 28 communicate with laterally extending cavities 29, which in turn communicate with the shoulder and strap cavities 21 and 22. It is obvious that the connector strap cavities are only provided for connecting the sets of plates of the end cells with the like set of plates of the intermediate cell. The openings 28 constitute means for pouring or injecting molten metal into cavities 21 and into the strap cavities 22. The openings 26 also constitute pouring or injection openings for certain shoulder cavities 21, as well as the openings for building up the battery terminal posts.

As previously brought out, the sections 16 and 17 after the molding thereof, are rigidly connected together to form the unitary cover C and the cover with the two parts integrally connected are then ready for connection with the battery plates and the case of the battery. At this point it is to be noted that the top section 17 is provided with transversely extending arcuate ribs 30 which take care of the reinforcing of the cover at the point of juncture of the cover with the case partitions 11 and these ribs 30 reduce the possibility of leakage of electrical current between cells caused by electrical conducting material laying on the cover, such as acid which would have a tendency to run off the raised portions of the cover.

Upon the proper placing of the battery plate lugs 15 in the ways 23, and the cover on the case, molten metal such as lead, is poured or injected into the openings 26 and 28, and the molten metal flowing into the cavities 21 around the upper ends of the lugs 15 will melt and join the lugs and thus shoulders 31 will be formed in the cavities 21 for supporting the upper ends of the plates, (see Figure 6). The molten metal in the cavities 22 will form the cell connector straps 32. The remaining metal in the lateral extensions 29 and openings 28 can be smoothed off at the upper ends of the openings as suggested in dotted lines in Figure 5. The molten metal in the lateral cavities 27 forms the joining straps for the terminal posts 33, shown in Figure 6 and these terminal posts 33 can be built up in the ordinary or any desired manner.

In view of the fact that the shoulders 31 and cell connector straps 32 are all molded in the cover directly, the same are completely housed within the dielectric material from which the cover is formed, and hence, shorts and the like are lessened or eliminated and the connector straps and shoulders are effectively supported and hence a rigid and durable construction is had for the cell plates.

Changes in details may be made without departing from the spirit or the scope of this invention, but what is claimed as new is:

1. A unitary cover for the case of a storage battery having individual cells, plate separators and plates with upstanding lugs, comprising an integral body formed from dielectric material having enclosed interior mold cavities for the reception of molten metal for forming shoulders for the lugs of the battery plates and connector straps for cells and portions of terminal posts, the body also having equidistantly spaced vertical plate lug receiving ways communicating with the bottoms of the cavities and pouring openings communicating with the upper portions of the cavities and opening out through the upper face of the body, whereby the cavities can be filled with molten metal after the cover is placed in position on the case.

2. A unitary cover for the case of a storage battery having partition walls defining individual cells, plate separators and plates with upstanding lugs in the cells, comprising an integral body formed from dielectric material having enclosed interior mold cavities for the reception of molten metal for forming shoulders for the lugs of the battery plates and connector straps for cells and portions of terminal posts, the body having equidistantly spaced vertical plate lug receiving ways communicating with the bottom of the cavities and pouring openings communicating with the upper portions of the cavities and opening out through the upper face of the body, the body closing the upper end of the case with the bottom walls of the connector strap cavities extending over the partition walls.

JOHN K. SHANNON.
ROBERT R. SCHMIT.

REFERENCES CITED

The following references are of record in the file of this patent:

UNITED STATES PATENTS

| Number | Name | Date |
|---|---|---|
| 1,692,316 | Smith | Nov. 20, 1928 |
| 1,703,735 | Holland | Feb. 26, 1929 |
| 1,882,414 | Ford | Oct. 11, 1932 |
| 1,907,420 | Finn | May 2, 1933 |
| 1,942,351 | Appel et al. | Jan. 2, 1934 |
| 2,387,590 | Koenig et al. | Oct. 23, 1945 |
| 2,480,964 | Randall | Sept. 6, 1949 |

FOREIGN PATENTS

| Number | Country | Date |
|---|---|---|
| 462,004 | Great Britain | Mar. 1, 1937 |
| 510,238 | Great Britain | July 27, 1939 |